UNITED STATES PATENT OFFICE.

ROBERT A. FISHER, OF PHILADELPHIA, PENNSYLVANIA.

DISINFECTANT.

SPECIFICATION forming part of Letters Patent No. 314,820, dated March 31, 1885.

Application filed August 30, 1884. (No specimens.)

*To all whom it may concern:*

Be it known that I, ROBERT A. FISHER, a citizen of the United States, residing at Philadelphia, in the county of Philadelphia and State of Pennsylvania, have made a certain new and useful Improvement in Disinfectants, of which the following is a full, clear, and exact description.

It has been and is now a settled question among hygienic experts and sanitary engineers that the substance commonly called "chloride of lime" is not only a powerful disinfectant and deodorizer, but one of the most efficacious of all known antiseptics. By simple exposure to the air, chloride of lime evolves chlorine gas, which, acting upon the germs of disease, completely destroys them. If this powerful chemical action of chloride of lime could in all cases be so controlled and directed against the germs of disease or bodies liable to putrefaction as to produce a regular and constant evolution of chlorine gas, no improvement could be made upon the only form in which chloride of lime has been hitherto furnished to commerce—*i. e.*, in the form of a fine powder very soluble in water. In cases where chloride of lime is to be exposed only to atmospheric action it can be used to advantage in the form of fine powder; but, because of its ready solubility in this form, chloride of lime fails when placed in water-closets, basins, or urinals, for in the presence of running water or other moving liquids it dissolves rapidly and is washed away, and the germicide and disinfection are produced not in the locality desired, but in remote drains and sewers. To obviate this difficulty I have invented a method of preventing such rapid dissolution and washing away of the chloride of lime by compounding it with material only slightly soluble in water, thereby bringing it into a condition in which the action of water or urine in motion dissolves and disintegrates it very slowly—so slowly, indeed, that a small lump or cake of this new substance placed in the basins of a water-closet or urinal will evolve chlorine gas uninterruptedly for many hours or even days.

To enable others skilled in the art to use my invention, I will now proceed to describe the manner in which I have carried it out.

I first prepare chloride of lime in the form of powder by exposing well-burned slaked lime upon shelves in suitably-constructed chambers to the action of chlorine gas after the usual method described in treatises upon chemical technology. The next step is to compound with the chloride of lime thus produced substances which by subsequent chemical reaction will produce a hard and compact mass that disintegrates or dissolves very slowly when exposed to the action of water or other liquids in motion. Different substances may be used to effect this object; but I prefer calcined sulphate of lime and water.

I mix very intimately, either by hand or by suitable machinery, one hundred (100) parts, by weight, of chloride of lime with fifty (50) parts, more or less, by weight, of finely-ground calcined sulphate of lime, (the exact amount of sulphate of lime required will depend upon the quality of the chloride of lime, which is not always of uniform composition.) This mixture of chloride of lime and calcined sulphate of lime I stir gradually by hand or by suitable machinery into twenty (20) parts, more or less, by weight, of water. The exact amount of water required will depend upon the proportion in which the chloride of lime and sulphate of lime have been used. The whole is then to be stirred or mixed until there results a homogeneous mass of a soft or pasty consistency. This mass is then run or worked into suitable molds of any desired size or shape. After the expiration of a few hours, the contents of the molds will have hardened into a dense mass or cake, which is ready to be used for disinfecting or antiseptic purposes as soon as removed from the mold.

Although I prefer to use molds in which to form the hardened mass, it is evident that molds are not actually necessary, as the compound will harden without them; nor do I confine myself to the use of the sulphate of lime with which to harden the mass, as other and equivalent articles can be used with good effect, such as a solution of the chloride of calcium and silicate of soda, the essential feature of my invention being in the production of a compound of the chloride of lime in the form of a hard and compact mass very slightly soluble in water.

I am aware of Patent No. 224,367, and therefore lay no claim to the composition therein described.

Having thus described my invention, what I claim as new, and desire to secure by Letters Patent, is—

The herein-described disinfectant, consisting of about one hundred parts of chloride of lime, about fifty parts calcined sulphate of lime, and about twenty parts of water, substantially as herein described.

ROBERT A. FISHER.

Witnesses:
CHRISTOPHER FALLON,
HARVEY A. MARTIN.